United States Patent [19]

Fabre-Curtat et al.

[11] 4,013,205
[45] Mar. 22, 1977

[54] GRIPPING SHOE EQUIPPING A DEVICE FOR PULLING AN ELONGATE MEMBER

[75] Inventors: Michel Fabre-Curtat, Lima, Peru; Jean Thiery, Le Pecq, France

[73] Assignee: Institut Francais du Petrole, des Carburants et Lubrifiants et Entreprise de Recherches et d'Activities Petrolieres Elf, France

[22] Filed: June 16, 1975

[21] Appl. No.: 586,932

[30] Foreign Application Priority Data

June 18, 1974 France ............................ 74.21550

[52] U.S. Cl. .............................................. 226/173
[51] Int. Cl.² ........................................ B65H 17/34
[58] Field of Search .... 254/18, 134.3 R, 134.3 PA, 254/134.3 FT, 134.5; 198/179, 189, 195–197, 131, 203, 227; 305/35 R, 35 EB, 39, 50–58; 226/172, 173

[56] References Cited

UNITED STATES PATENTS

| | | | |
|---|---|---|---|
| 2,312,072 | 2/1943 | Broadwater | 305/35 R |
| 2,667,386 | 1/1954 | Mathisen | 305/35 R |
| 2,715,958 | 8/1955 | Lindstrom | 198/189 |
| 3,778,094 | 12/1973 | Grolet et al. | 294/1 R |

*Primary Examiner* — Robert B. Reeves
*Assistant Examiner* — John P. Shannon
*Attorney, Agent, or Firm* — Craig & Antonelli

[57] ABSTRACT

A new type of gripping shoe for traction devices of the caterpillar type, comprising a deformable element of composite structure. The deformable element comprises a body member which is mechanically resistant, deformable and of low elasticity. This body member is provided with a large internal recess housing a sole member of a highly deformable, elastic and substantially incompressible material.

8 Claims, 4 Drawing Figures

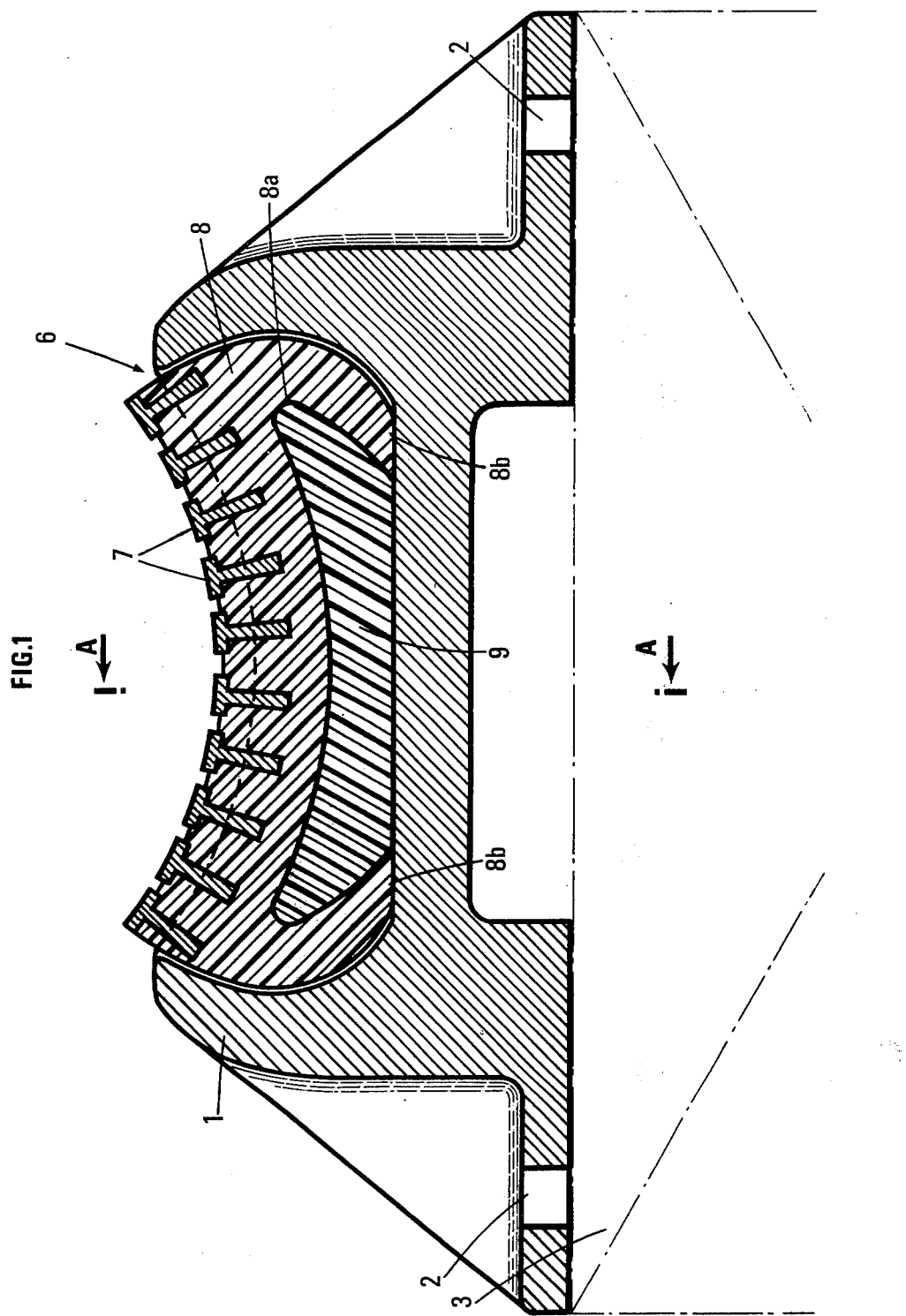

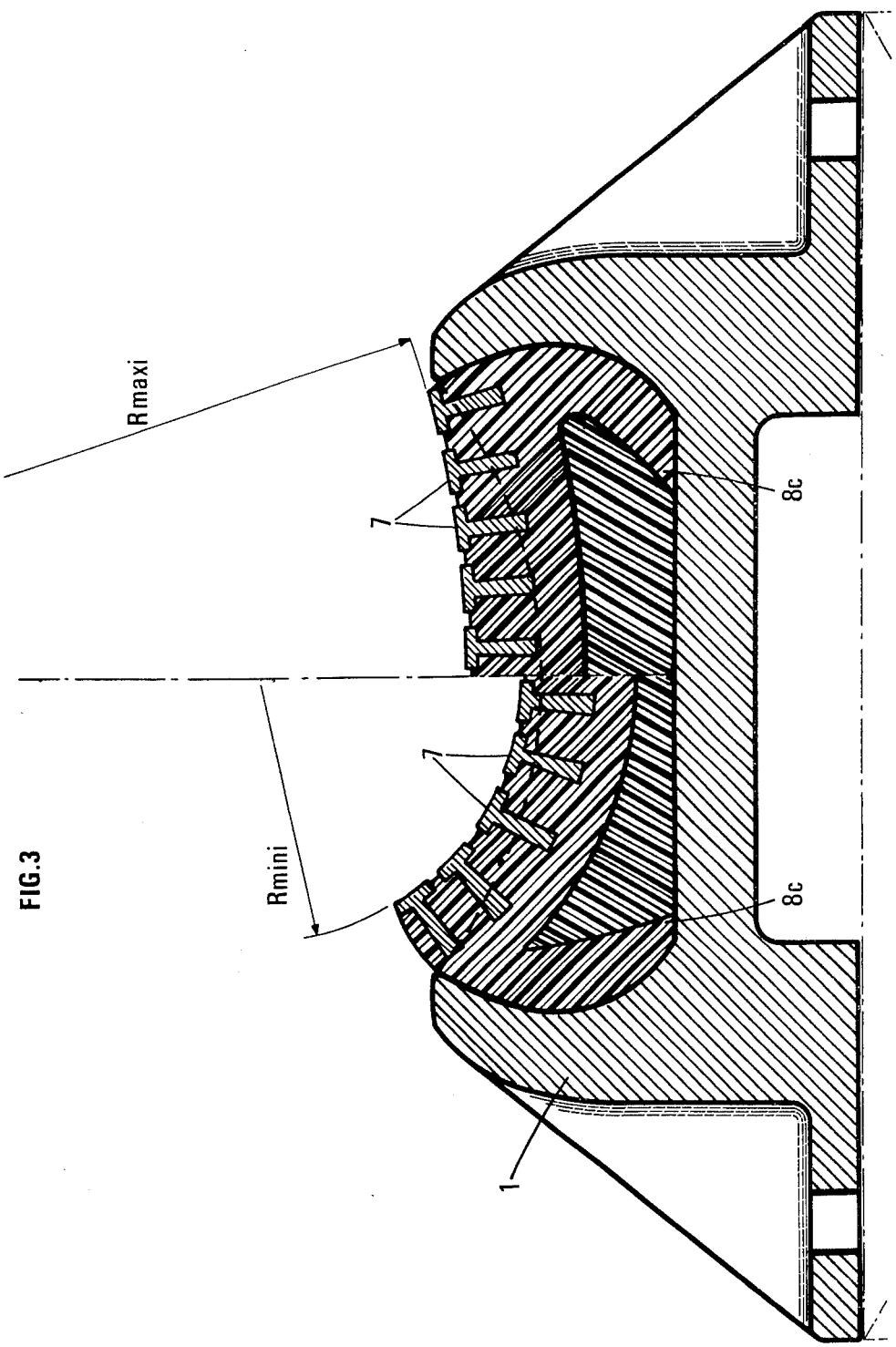

GRIPPING SHOE EQUIPPING A DEVICE FOR PULLING AN ELONGATE MEMBER

The present invention relates to a new type of gripping shoe equipping a device for pulling an elongate member, such as a cable, a rod or a tubing.

This gripping shoe is, in particular, useful for caterpillars having at least one endless chain for pulling elongate members.

These shoes have generally a profile adapted to the cross sectional shape of the elongate member and have sometimes on their wall a lining destined to contact the elongate member.

However the structure of the gripping shoes which have been used up to now is not sufficiently deformable and consequently the surface of contact of these shoes with the elongate member does not vary with the changes in the cross section of this elongate member, which result for example, from the variations in the degree of elongation of the latter under the influence of the variations in the tension to which the elongate member is subjected.

The object of the present invention is accordingly to provide a new type of gripping shoe for equipping a device for pulling an elongate member, which substantially adapts itself to the variations in the cross section of this element and thereby maintains a substantially constant contact area with the latter.

Figure 1A:
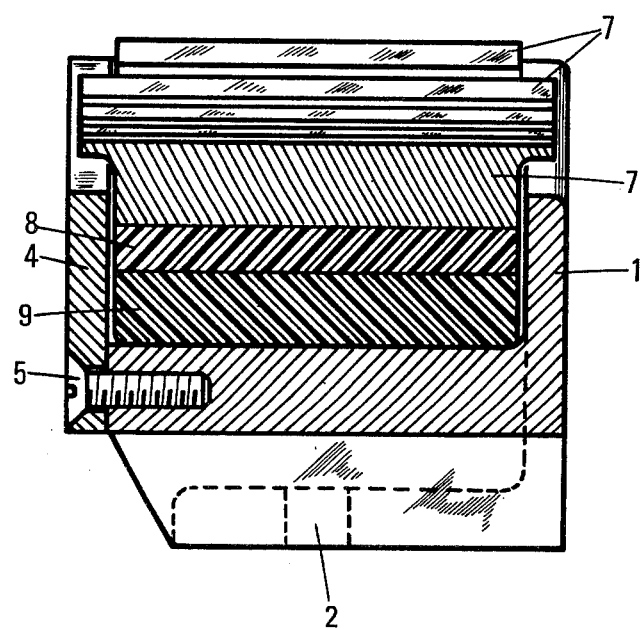
Figure 2:
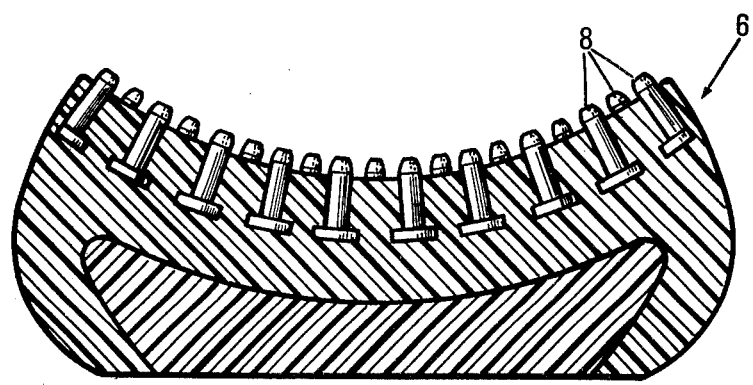

The invention is illustrated by the accompanying drawings wherein:

FIG. 1 shows a non-limitative embodiment of a gripping shoe according to the invention, FIG. 1A is a section along the axis A—A of the gripping shoe of FIG. 1, FIG. 2 illustrates another embodiment, and FIG. 3 shows the deformation of a gripping shoe according to the invention, in dependance with the variations in the cross section of the elongate member, on which this shoe is pressed.

In the drawings, reference numeral 1 indicates the rigid casing of the gripping shoe, adapted to be secured (e.g by screws passing through bores 2) to the pulling device, for example to a link 3 of a pulling caterpillar having two endless chains carrying gripping shoes which clamp the elongate member to be pulled, this member being, for example, a cable, a rod, or a pipe or tubing.

The casing 1 is open on its side opposite to the securing means and, in the embodiment illustrated by FIG. 1A, is provided with a side-cover 4 secured by bolts 5.

A deformable element, designated as a whole by reference numeral 6, is housed in this casing. The wall of this element opposite the bottom of the casing is of concave shape, with a radius of curvature at rest substantially equal to the average radius of the elongate member to be gripped. This wall of the deformable element carries a wear or friction resistant means.

In the embodiments illustrated by FIGS. 1 and 1A, this wear resistant means is made of a plurality of gripping elements 7, extending in the direction of advancement of the pulling device.

In another embodiment, illustrated by FIG. 2, the wear resistant means is made of nail-shaped elements 8 having a head located in the deformable element of the gripping shoe.

According to the invention, the deformable element 6 has a composite structure which enables it to perfectly adapt itself to the variations in cross section of the elongate member to be gripped, including very local variations of this cross section.

It comprises a body member 8 provided with a wide internal recess 8a.

This body member carries the gripping elements 7 and is both elastic and mechanically resistant, its hardness being greater than 85, preferably greater than 90 in the Shore scale. As a consequence the body member 8 cannot flow out of the casing under the influence of a pressure.

It may, for instance, but not limitatively, be made of polyurethane. Certain types of nylons which possess the above-indicated characteristics may also be used, such as those sold under the trade mark Enkalon. In the illustrated embodiment, the recess 8a is open at its lower end, toward the bottom of casing 1, where it is limited by two lips 8b.

Inside the recess 8a is housed a sole 9 made of a more deformable material than body member 8, this material having a high elasticity and being substantially incompressible (i.e. being easily deformable under a pressure stress, without any substantial variation of its overall volume, which provides for a good pressure transmission). The elasticity of the material constituting the sole 9 will preferably be greater than 500%, advantageously in the order of 700 to 800%. The sole 9 may for instance be made of neoprene, but the best results have been obtained up to now with silicone elastomers.

The deformation of the gripping shoe, under the action of a variation in diameter of the elongate-member gripped by this shoe, is illustrated by FIG. 3.

Following these variations in diameter, the rims 8c of the lips 8b are brought closer to each other or alternatively moved away from each other (with respect from the position at rest corresponding to the average diameter of the elongate member).

To these variations in the spacing of the rims 8c of the lips 8b correspond pressure variations at the level of the elements 7 of the wear resistant means of the shoe, these pressure variations being transmitted by the elastic shoe 9.

Through the particular construction of the sole 9 of the gripping shoe according to the invention, this transmission of the pressure variations to the different elements 7 of the wear resisting means occurs uniformly.

This sole 9 is substantially incompressible, which results in a good pressure transmission, and is also highly elastic, but not plastic. Consequently this sole 9 is deformed as if its constituting material were flowing under the action of the pressures applied thereto, but without any risk for this material of becoming extruded at the ends of the gripping shoe.

As it is apparent from the foregoing, one will not depart from the scope of the present invention by using a gripping shoe wherein the body member 8 is not open at its bottom, but rather completely surrounds the elastic sole 9.

What we claim is:

1. A gripping shoe which is to be secured to a pulling device to enable said pulling device to pull an elongated member by providing traction between said device and said elongated member comprising, in combination:

a rigid casing provided with means for securing said casing to the pulling device, said casing being open on a side opposite said securing means; and a deformable element housed in said casing and provided with wear-resistant friction means for contacting the elongated member, wherein said deformable element has a composite structure comprising a body member provided with a large internal recess, said body member carrying said wear-resistant friction means and being at the same time deformable, of low elasticity, and mechanically resistant, and a sole member of a highly deformable, elastic and substantially incompressible material, said sole member being housed in said recess and filling substantially the whole volume thereof.

2. A gripping shoe according to claim 1, wherein said body member of the gripping shoe is made of a material whose hardness is greater than 85 Shore.

3. A gripping shoe according to claim 1, wherein said sole member is made of a material having an elasticity which is greater than 500%.

4. A gripping shoe according to claim 1, wherein said body member is made of polyurethane.

5. A gripping shoe according to claim 1, wherein said sole member is made of a silicone elastomer.

6. A gripping shoe according to claim 1, wherein said recess and said sole member are substantially crescent-shaped and have their concavity facing said wear-resistant friction means.

7. A gripping shoe according to claim 1, wherein said body member completely surrounds said sole member of deformable material.

8. A gripping shoe according to claim 1, wherein said recess is open on its side opposite said wear-resistant friction means and is limited by two lateral lips on said side.

* * * * *

UNITED STATES PATENT AND TRADEMARK OFFICE
CERTIFICATE OF CORRECTION

PATENT NO. : 4,013,205
DATED : March 22, 1977
INVENTOR(S) : Michel Fabre-Curtat, et al It is certified that error appears in the above-identified patent and that said Letters Patent are hereby corrected as shown below:

Title Page, (73) Assignee, which now reads:

" (73) Assignee: Institut Francais du Petrole, des Carburants et Lubrifiants et Entreprise de Recherches et d'Activities Petrolieres Elf, France "

should read as follows:

-- (73) Assignee: Institut Francais du Petrole, France --

Signed and Sealed this

Fifth Day of June 1979

[SEAL]

Attest:

RUTH C. MASON
*Attesting Officer*

DONALD W. BANNER
*Commissioner of Patents and Trademarks*